Aug. 15, 1950 — L. O. SCOTT — 2,518,822
TOBACCO SEED PLANTER
Filed Sept. 6, 1946 — 3 Sheets-Sheet 1
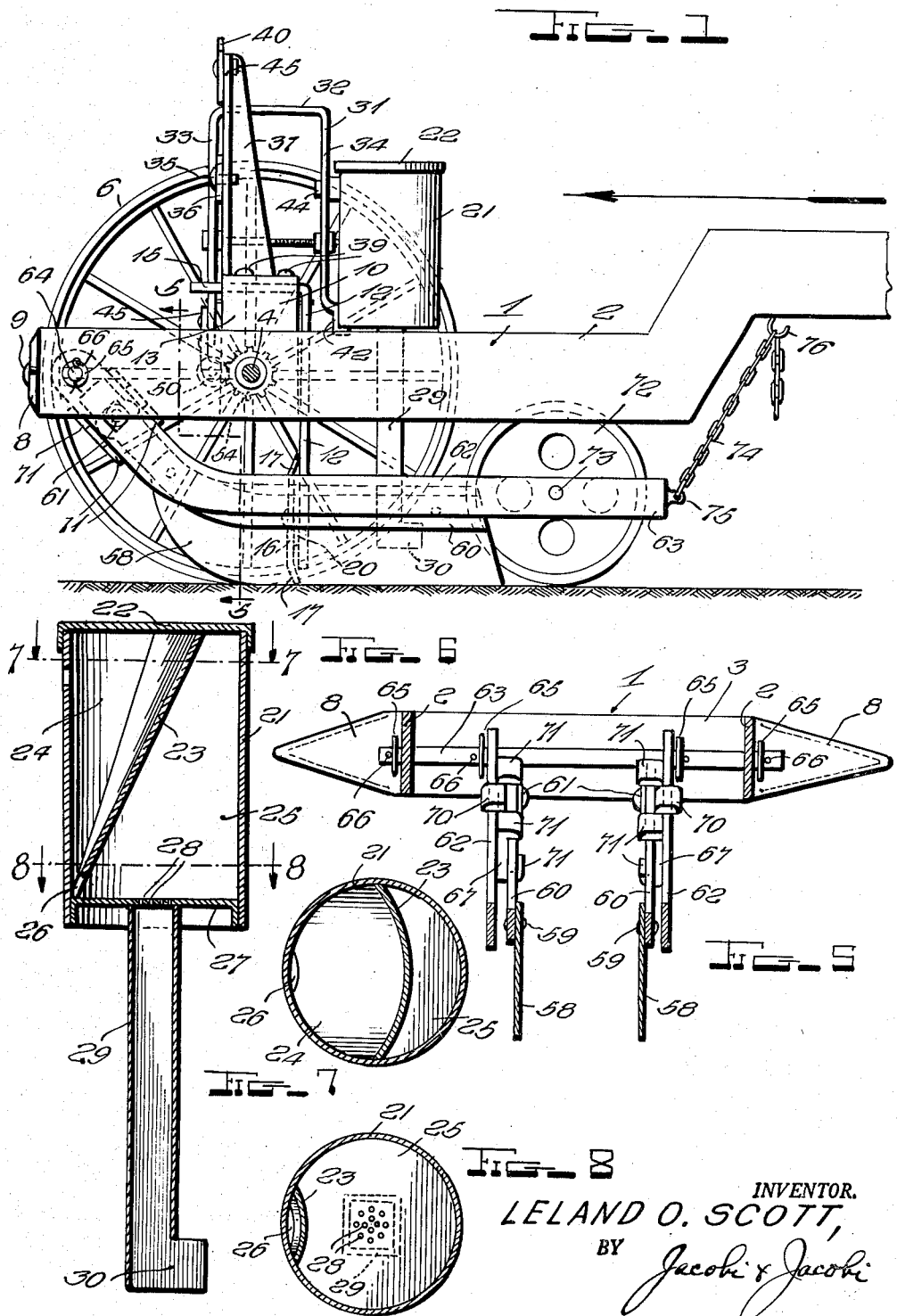
INVENTOR.
LELAND O. SCOTT,
BY Jacobi & Jacobi
ATTORNEYS

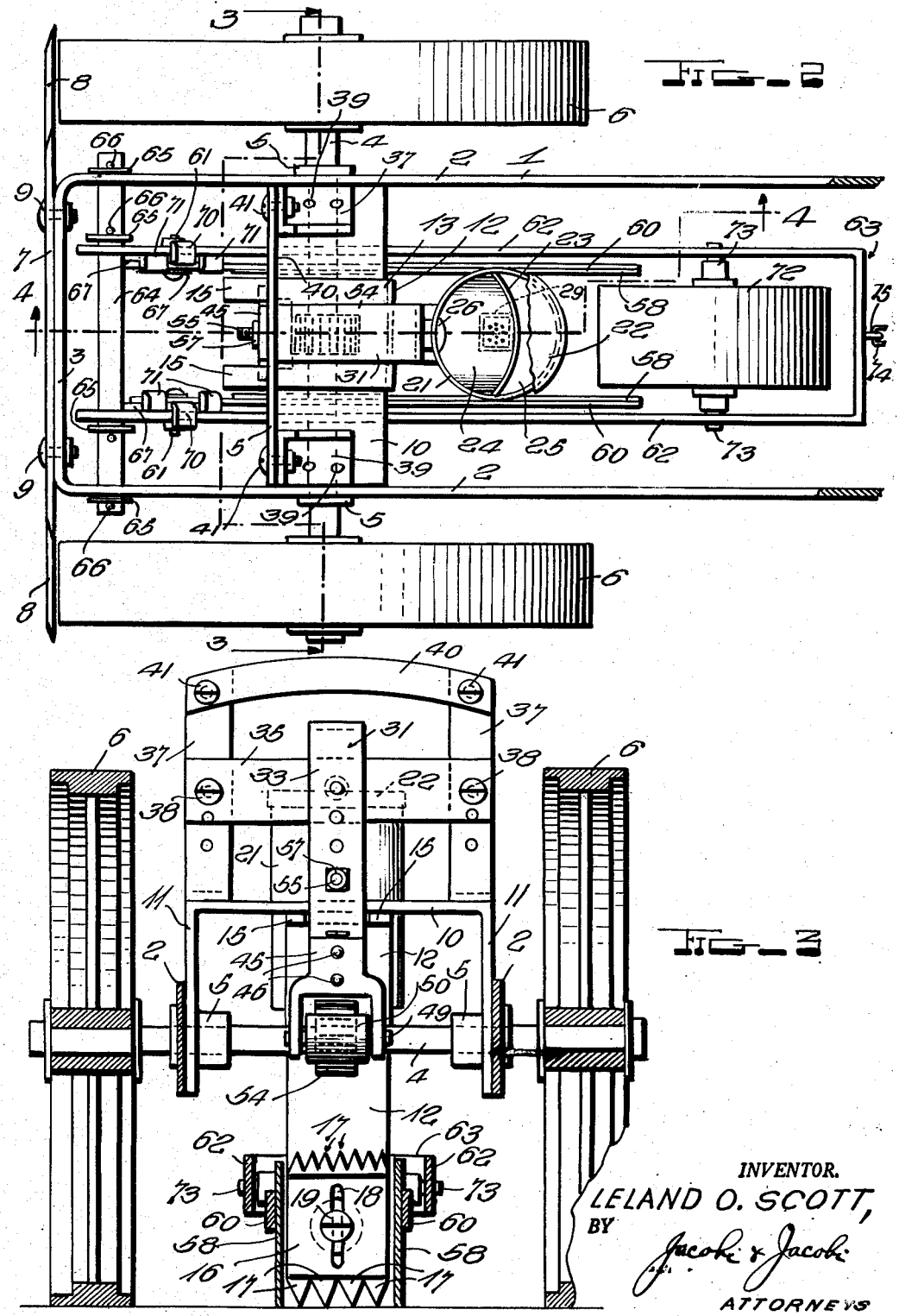

Aug. 15, 1950 L. O. SCOTT 2,518,822
TOBACCO SEED PLANTER
Filed Sept. 6, 1946 3 Sheets-Sheet 3
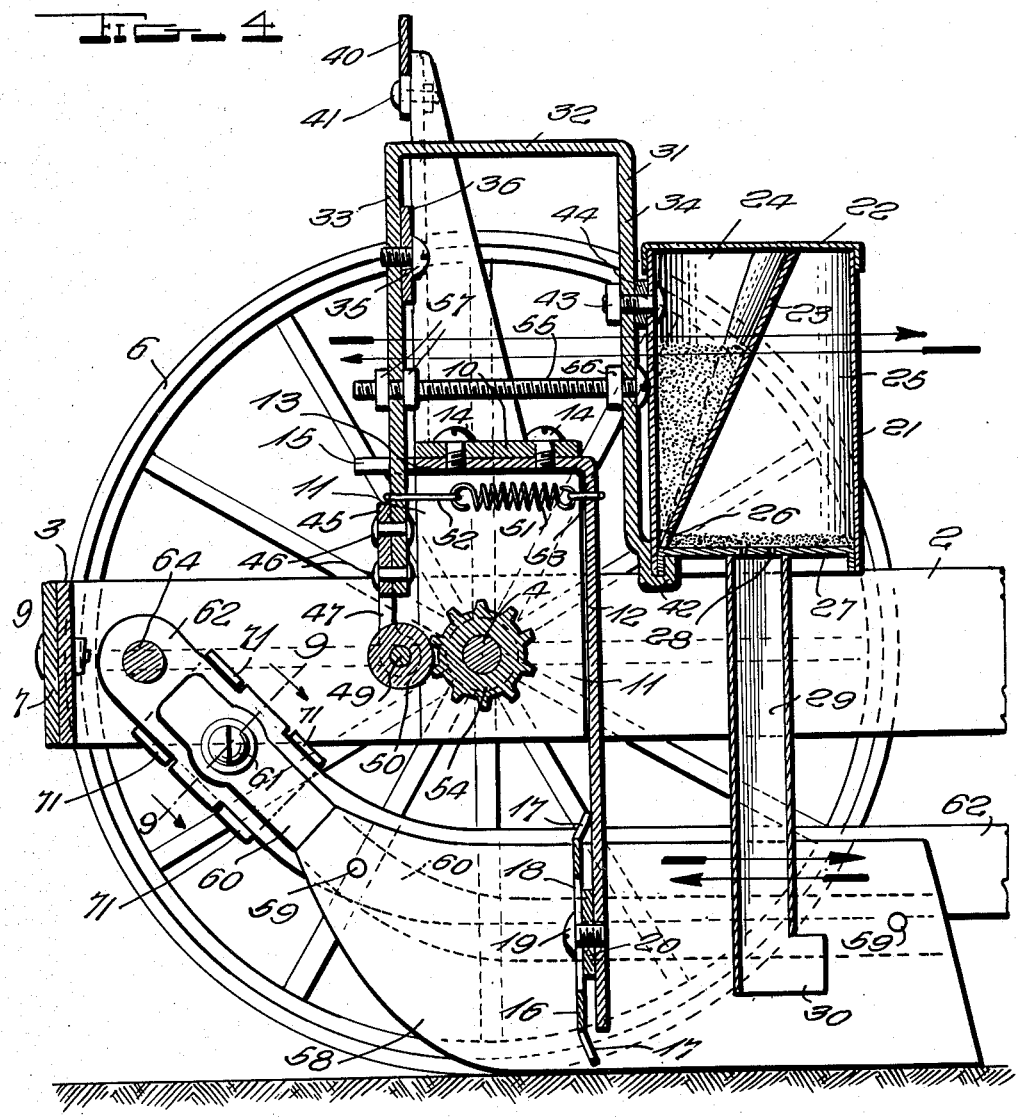
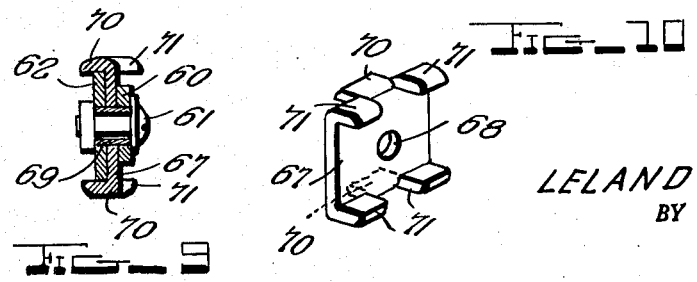
INVENTOR.
LELAND O. SCOTT,
BY Jacobi & Jacobi
ATTORNEYS Patented Aug. 15, 1950

2,518,822

UNITED STATES PATENT OFFICE 2,518,822

TOBACCO SEED PLANTER

Leland O. Scott, Goldsboro, N. C.

Application September 6, 1946, Serial No. 695,198

5 Claims. (Cl. 111—75)

1

This invention relates to a tobacco seeding machine, and it is one object of the invention to provide a machine so constructed that it may be pushed across a field and shallow trenches formed to receive seed dropped from a seed container forming an element of the machine.

Another object of the invention is to provide a seeder having the seed container provided with a depending spout which has its lower portion disposed between shields between which trenches are formed and thus cause the seed to be dropped into trenches formed in the ground without being blown away from the trenches transversely thereof as they drop from the spout.

Another object of the invention is to provide the seeder with a seed container mounted so that as the machine is pushed across a field vibrating movement will be imparted to the container and seed in the container caused to sift through outlet perforations into the spout.

Another object of the invention is to provide supporting means for the container adapted to be mounted vertically midway the width of the frame of the seeding machine and carrying at its lower end a roller which is yieldably held in contact with a toothed wheel or gear fixed upon the shaft or axle of the machine so that it turns with the axle and imparts short vibrating movement to the support and the container as the machine moves forwardly across a field.

Another object of the invention is to provide a seeding machine having a seed container divided to form a compartment in which a mass of seed is placed and a spreader compartment into which the seed passes and spreads out upon the bottom of the spreader compartment so that it may sift through a group of small perforations in the bottom of the spreader compartment and drop downwardly through the spout into the ground.

Another object of the invention is to provide a seeding machine which is of simple construction, efficient in operation and strong and durable.

The invention is illustrated in the accompanying drawings wherein:

Figure 1 is a side elevation of the improved seeding machine;

Figure 2 is a top plan view of the seeding machine;

Figure 3 is a sectional view taken transversely through the seeding machine along the line 3—3 of Figure 2;

Figure 4 is a longitudinal sectional view taken along the line 4—4 of Figure 2;

Figure 5 is a fragmentary sectional view taken along the line 5—5 of Figure 1;

Figure 6 is a sectional view upon an enlarged scale taken vertically through the seed container and its spout;

Figure 7 is a sectional view taken transversely through the seed container along the line 7—7 of Figure 6;

2

Figure 8 is a sectional view taken through the seed container along the line 8—8 of Figure 6;

Figure 9 is a sectional view taken along the line 9—9 of Figure 4; and

Figure 10 is a perspective view of the bracket by means of which the shank of the shield is connected with an auxiliary frame of the seeder.

This improved seeding machine has a main frame 1 which is formed of strong metal and has side bars 2 connected at their front ends by a cross bar or bridge 3. The side bars 2 may be of any desired length and will have their rear portions connected with a suitable handle by means of which the machine is to be pushed across a field constituting a seed bed. A shaft or axle 4 which extends transversely of the frame is rotatably mounted through bearings 5 of the side bars 2 and has its end portions projecting outwardly from the side bars and carrying wheels 6 which are fixed to the shaft so that as the wheels turn the shaft will turn with them. A strip 7 which has its end portions tapered to form scraping blades 8 is secured against the front face of the bridge 3 by bolts 9, and since the blades project from opposite sides of the frame in front of the wheels 6, they will serve to scrape dirt from the wheels and keep the wheels clean during use of the seeder.

A yoke 10 extends transversely of the main frame with its depending arms 11 secured against the side bars 2. A standard 12 formed of stiff metal extends vertically back of the yoke and at its top is provided with a forwardly extending arm 13 which is secured against the under face of the yoke by screws 14, the front end portion of the arm 13 being extended beyond the bridge and formed with fingers 15 which are spaced from each other transversely of the arm. The standard has its lower end spaced upwardly from the ground and carries a blade or plate 16 which has upper and lower end portions bent rearwardly and serrated to form teeth 17 by means of shallow trenches in the ground as the seeder is moved forwardly. The blade or plate 16 may have either end disposed downwardly in position for forming the trenches and midway its width is formed with a vertical slot 18 through which a screw 19 passes to secure the plate to the standard. Since the plate is formed with a slot it may be shifted vertically to regulate the depth of the trenches formed by its teeth 17. A block 20 which is disposed between the plate and the front face of the standard holds the plate parallel to the standard.

In order to hold a quantity of tobacco seeds, which are very small, there has been provided a container 21 which is formed of metal and is of cylindrical shape. The container is disposed vertically back of the standard and has its open upper end closed by a removable cover 22. A partition 23 extends vertically in the container at such an incline that it slopes forwardly towards its lower end with its upper end disposed substantially diametrically of the container and its lower end close to the forward portion of the wall of the container. The partition divides the container into a front chamber 24 to receive a supply of seeds that are poured and a rear chamber 25 into which seeds flow from the front chamber through an opening 26 at the lower end of the partition. Since the partition is arcuate transversely, it will serve as a chute for directing the seed towards the opening 26 and all of the seed will flow from the front chamber into the rear chamber when the machine is in use. Upon entering the rear chamber the seeds spread out and form a thin layer upon the bottom 27 of the container, and when the container is vibrated, the seeds will sift through the group of small perforations 28 formed at the center of the bottom of the container and drop into the spout 29. The spout extends downwardly from the container and is open at its lower end for discharge of seeds upon the ground. The spout is square in cross section, as shown in Figure 8, and lower ends of its side walls are extended rearwardly to form wings 30 which project from the spout and allow the seeds falling through the spout in a cloud to spread out rearwardly and drop upon the ground and enter the trenches formed by the teeth of the blade.

The container is carried by a bracket 31 which is of inverted U-shape and has an upper cross bar 32 and front and rear arms 33 and 34. The front arm of bracket 31 is secured by a screw 35 flat against a cross bar or strip 36 which is formed of resilient metal and secured at its ends to posts 37 by bolts 38. The posts are rigidly mounted upon end portions of the yoke 10 by fasteners 39 and braced against tilting out of a vertical position by a cross bar 40 which is curved longitudinally and secured to the standards by bolts 41. A hook 42 at the lower end of the rear arm 34 of bracket 31 forms a seat for the flanged lower end of the container 21 and a bolt 43 carrying a spacer 44 firmly secures the container in place upon the rear arm in slight spaced relation thereto so that the cover 22 may be readily removed for filling the compartment 24 with seeds. The front arm of the bracket 31 extends between the fingers 15 of the arm 13 of standard 12 and against the front face of its lower end portion is disposed a bearing bracket 45 which is secured by rivets 46 and has depending legs 47 between which is mounted a shaft 49 carrying a roller 50. A helical spring 51 extends horizontally between the upper portion of the standard 12 and the lower portion of the arm 33 and is mounted under tension by anchoring loops 52 and 53. This spring holds the roller in engagement with a toothed wheel 54 fixed upon the shaft 4, and from an inspection of Figure 4, it will be seen that as the shaft turns the toothed wheel 54 will act upon the roller 50 and impart vibrating movement to the bracket 31. This vibrating of the bracket will cause the container to be vibrated and the tobacco seeds will be caused to be sifted through the openings 28 and fall downwardly through the spout 29 from which they pass onto the ground. A bolt 55 which passes horizontally through the arms of the bracket and is secured by nuts 56 and 57 serves to brace the arms of the bracket against movement relative to each other and, therefore, the bracket will vibrate as a unit during operation of the seeder.

Since the tobacco seeds are very small, wind would be liable to blow seeds dropping from the lower end of the spout away from the trenches formed by the teeth of the blade 16. In order to prevent this, there have been provided shields 58. These shields are formed from metal plates which extend longitudinally of the seeder and their front end portions curved upwardly so that the shields may move forwardly along the ground without catching. The shields or plates are secured by rivets 59 to bars 60 which have forward portions projecting from the plates and extending at an upward incline and near their front ends are widened so that openings may be formed through them to receive bolts 61 and connect the bars or shanks 60 with the side bars 62 of an auxiliary frame 63. The auxiliary frame has its side bars pivotally mounted about a shaft 64 which extends transversely of the seeding machine between forward end portions of the side bar 2 of the main frame 1. Washers 65 are fitted about the shaft to prevent longitudinal movement of the shaft through the side bars 2 and shifting of the auxiliary frame along the shaft and these washers are held in place about the shaft by cotter keys 66. Plates or brackets 67 are disposed between confronting side faces of the side bars 62 and the forward end portions of the bars 60 and formed with openings 68 to receive the bolts 61 and since the bolts pass through spacer sleeves 69, the bolts may be tightened without exerting binding action which would prevent vertical tilting of the bars 60 and the shields 58. Center tongues 70 which project laterally from upper and lower edges of the plates engage across upper and lower edges of the bars 62 to prevent tilting of the brackets or plates 67 about the sleeves 69 and in order to limit tilting of the bars or shanks 60, there have been provided front and rear tongues 71 which project laterally from the brackets across the upper and lower edges of the shanks. When the shields are resting upon the ground in the position shown in Figure 4, the edges of the shanks are spaced from the tongues 71 and allow the shanks to have tilting movement which permits the shields to follow uneven surfaces or pass over stones which may be encountered, but such tilting movement will be limited by engagement of the shanks with the tongues. A roller 72 which is disposed between side bars of the auxiliary frame and has its stub shafts 73 rotatably mounted through openings in the side bars, and this roller rests upon the ground to support the auxiliary frame. A chain 74 is connected at one end with a lug 75 at the rear end of the auxiliary frame and detachably engaged with a hook 76 carried by the main frame so that by adjusting the chain vertical tilting of the auxiliary frame may be controlled. When the chain is drawn upwardly a sufficient distance, it will support the auxiliary frame at such a height that the roller 72 will be out of contact with the ground and the blades or shields held off of the ground. The seeder may then be moved forwardly without the shields dragging along the ground. The roller, when in its lowered position, rolls along the ground and serves to pack seed into the ground.

From the foregoing description of the construction of my improved device, the operation thereof will be readily understood and it will be seen that I have provided a comparatively simple, inexpensive and efficient means for carrying out the various objects of the invention. While I have described the elements best adapted to perform the functions set forth, it is apparent that various changes in form, proportion and in the minor de-

Having thus described the invention, what is claimed is:

1. A seeding machine comprising a main frame, an axle rotatably mounted transversely of the main frame, wheels fixed to said axle, a yoke mounted across the main frame over said axle, a standard disposed vertically and having a forwardly extending arm at its upper end secured to the yoke and provided with fingers projecting forwardly from the yoke, a blade mounted against the lower end portion of said standard for vertical adjustment and having teeth across its lower end for forming seed-receiving trenches in the ground as the machine is moved forwardly, posts rising from said yoke at opposite sides of the frame, a resilient cross strip carried by said posts, a bracket of inverted U-shape having a bridge spaced upwardly from the cross strip and depending front and rear arms, the front arm being secured to the cross strip and extending downwardly between the fingers, a seed container carried by the rear arm having a bottom formed with a group of outlet perforations and a depending spout surrounding the outlet perforations, a brace carried by and extending between the front and rear arms of the bracket, a bearing bracket carried by and extending downwardly from the front arm, a roller rotatably mounted across the lower end of the bearing bracket in front of said axle, a wheel rigidly mounted about the axle back of the roller, and a spring mounted under tension between the standard and the front arm of the bracket under the yoke and exerting pull upon the front arm to yieldably hold the roller against the wheel and cause vibration of the bracket by the wheel as it turns and thereby vibrate the container to sift seed through its perforations into the spout.

2. A seeder comprising a main frame, an axle rotatably mounted transversely of the main frame, wheels fixed to the axle, a toothed wheel fixed to said axle, a yoke mounted upon the frame over the axle, a standard extending downwardly from said yoke and having means at its lower end for forming seed-receiving trenches in ground as the seeder is moved forwardly, posts rising from said yoke, a resilient cross strip carried by said posts, a bracket straddling the yoke and the cross strip and having front and rear arms, the front arm being secured to the cross strip and extending downwardly in front of the yoke, a roller mounted at the lower end of the front arm in front of the toothed wheel, a seed container carried by the rear arm and having outlet perforations in its bottom and a depending spout, and a spring mounted between the standard and the front arm of the bracket and exerting rearward pull to yieldably hold the roller against the wheel and cause vibration of the bracket and the container to sift seeds through the outlet perforations into the spout during movement of the seeder along the ground.

3. A seeding machine comprising a main frame, an axle rotatably mounted across the frame, wheels fixed upon the axle, a support mounted across said frame, a standard depending from said support and provided with means for forming seed-receiving trenches in ground as the seeding machine is moved forwardly, a resilient strip mounted transversely of the frame over the support, a bracket carried by said strip and having front and rear arms straddling the support and the standard, a seed container carried by the rear arm and formed with outlet perforations in its bottom, a toothed wheel carried by and turning with the axle, a roller rotatably supported at the lower end of the front arm, and a spring between the standard and the front arm exerting pull upon the front arm and yieldably holding the roller against the toothed wheel for causing vibration of the bracket and the seed container to sift seed through the outlet perforations and into trenches formed in the ground as the seeding machine is moved forwardly.

4. A seeder comprising a main frame, an axle rotatably mounted across said frame, wheels carried by said axle, a support carried by said frame, a standard carried by said support and provided with means for forming seed-receiving trenches during forward movement of the seeder, a resilient strip carried by said support, a bracket straddling said support and secured to said resilient strip and thereby mounted for vibrating movement, a seed-container carried by said bracket back of said support, said container being formed with outlet perforations in its bottom and having a depending spout located back of said standard, a toothed wheel turning with said axle, a roller carried by said bracket, and a spring connected with the standard and the bracket and yieldably holding the roller against the toothed wheel for causing vibration of the bracket and the seed container and thereby causing seeds to be sifted out of the container through the outlet perforations during forward movement of the seeder.

5. A seeder comprising a main frame, an axle rotatably mounted across said frame, wheels carried by said axle, a mounting carried by and extending upwardly from said frame and including a resilient strip extending transversely of the frame, a bracket over said frame having a bridge and front and rear arms extending downwardly from its bridge, the front arm being secured to said resilient strip and extending downwardly therefrom, a seed container carried by the rear arm of said bracket and having a bottom formed with outlet perforations, and a member carried by and turning with said axle and co-operating with the front arm for vibrating the bracket and the resilient strip and thereby vibrating the seed container and causing seeds to be shaken from the container through the perforations as the seeder is moved across a field.

LELAND O. SCOTT.

REFERENCES CITED

The following references are of record in the file of this patent:

UNITED STATES PATENTS

| Number | Name | Date |
|---|---|---|
| 329,020 | Collins | Oct. 27, 1885 |
| 404,077 | Eaton | May 28, 1889 |
| 544,222 | Gray | Aug. 6, 1895 |
| 882,379 | Gilbreath | Mar. 17, 1908 |
| 912,635 | Ware | Feb. 16, 1909 |
| 1,113,242 | Pace | Oct. 13, 1914 |
| 1,433,856 | Smith | Oct. 31, 1922 |
| 1,967,915 | Tubbs | July 24, 1934 |
| 2,196,289 | Bracchiglione | Apr. 9, 1940 |
| 2,216,423 | Scott | Oct. 1, 1940 |

FOREIGN PATENTS

| Number | Country | Date |
|---|---|---|
| 552,407 | Great Britain | Apr. 6, 1943 |